United States Patent
Hudson

(10) Patent No.: US 9,895,846 B2
(45) Date of Patent: Feb. 20, 2018

(54) MULTI-PART COUNTING SYSTEM FOR THREE-DIMENSIONAL PRINTED PARTS

(71) Applicant: SHAPEWAYS, INC., New York, NY (US)

(72) Inventor: Alan D. Hudson, New York, NY (US)

(73) Assignee: Shapeways, Inc., New York, NY (US)

( * ) Notice: Subject to any disclaimer, the term of this patent is extended or adjusted under 35 U.S.C. 154(b) by 241 days.

(21) Appl. No.: 14/686,015

(22) Filed: Apr. 14, 2015

(65) Prior Publication Data

US 2016/0303803 A1 Oct. 20, 2016

(51) Int. Cl.
| | |
|---|---|
| *G06F 19/00* | (2011.01) |
| *B29C 67/00* | (2017.01) |
| *G06Q 10/04* | (2012.01) |
| *G05B 19/4099* | (2006.01) |
| *B33Y 50/02* | (2015.01) |

(52) U.S. Cl.
CPC ...... *B29C 67/0088* (2013.01); *G05B 19/4099* (2013.01); *G06Q 10/04* (2013.01); *B33Y 50/02* (2014.12); *G05B 2219/35134* (2013.01); *G05B 2219/49007* (2013.01)

(58) Field of Classification Search
CPC ............ B29C 67/0088; G05B 19/4099; G05B 2219/35134; G05B 2219/49007; G06Q 10/04; B33Y 50/02
USPC .......................................................... 700/98
See application file for complete search history.

(56) References Cited

U.S. PATENT DOCUMENTS

| | | | | |
|---|---|---|---|---|
| 2012/0287129 A1* | 11/2012 | Storti | ..................... | G06K 9/342 345/424 |
| 2013/0176312 A1* | 7/2013 | Schouwenburg | ... | B29C 67/0088 345/424 |
| 2013/0297059 A1* | 11/2013 | Griffith | ................ | B29C 67/0088 700/98 |
| 2014/0236773 A1 | 8/2014 | Hamilton et al. | | |
| 2015/0293722 A1* | 10/2015 | Cudak | ................. | B29C 67/0088 358/1.15 |

(Continued)

OTHER PUBLICATIONS

International Search Report and Written Opinion for International Application No. PCT/US2016/027464 dated Jul. 19, 2016.

(Continued)

*Primary Examiner* — Robert Cassity
(74) *Attorney, Agent, or Firm* — Wolf, Greenfield & Sacks, P.C.

(57) ABSTRACT

According to one aspect, embodiments herein provide a 3D printing system comprising an interface, a database, a production planning system configured to receive a model provided by a user, and a multi-part counting system configured to receive, from the production planning system, the user-provided model, calculate a bounds of the user-provided model, perform a first test on each of the plurality of pieces of the model to determine if each piece can escape the bounds of the model individually in relation to each other piece of the model, perform a second test on each of the plurality of pieces of the model to determine if each piece can escape the bounds of the model simultaneously in relation to all other pieces of the model, and output, based on the first test and the second test, a determination of different discrete and interlocking parts in the model.

17 Claims, 11 Drawing Sheets

(56) References Cited

U.S. PATENT DOCUMENTS

2016/0052058 A1* 2/2016 Bonke ................ B22F 3/1055
  419/7
2016/0209819 A1* 7/2016 Cudak .................... G05B 15/02

OTHER PUBLICATIONS

Agathos et al., 3D Mesh Segmentation Methodologies for CAD Applications. Computer-Aided Design and Applications. 2007;4(6):827-41.

Dickinson et al., Packing Subsets of 3D Parts for Layered Manufacturing. International Journal of Smart Engineering System Design. 2002;4(3):147-61.

Lau et al., Converting 3D Furniture Models to Fabricatable Parts and Connectors. ACM Siggraph 2011 Papers. 2011;30(4):1-6.

* cited by examiner

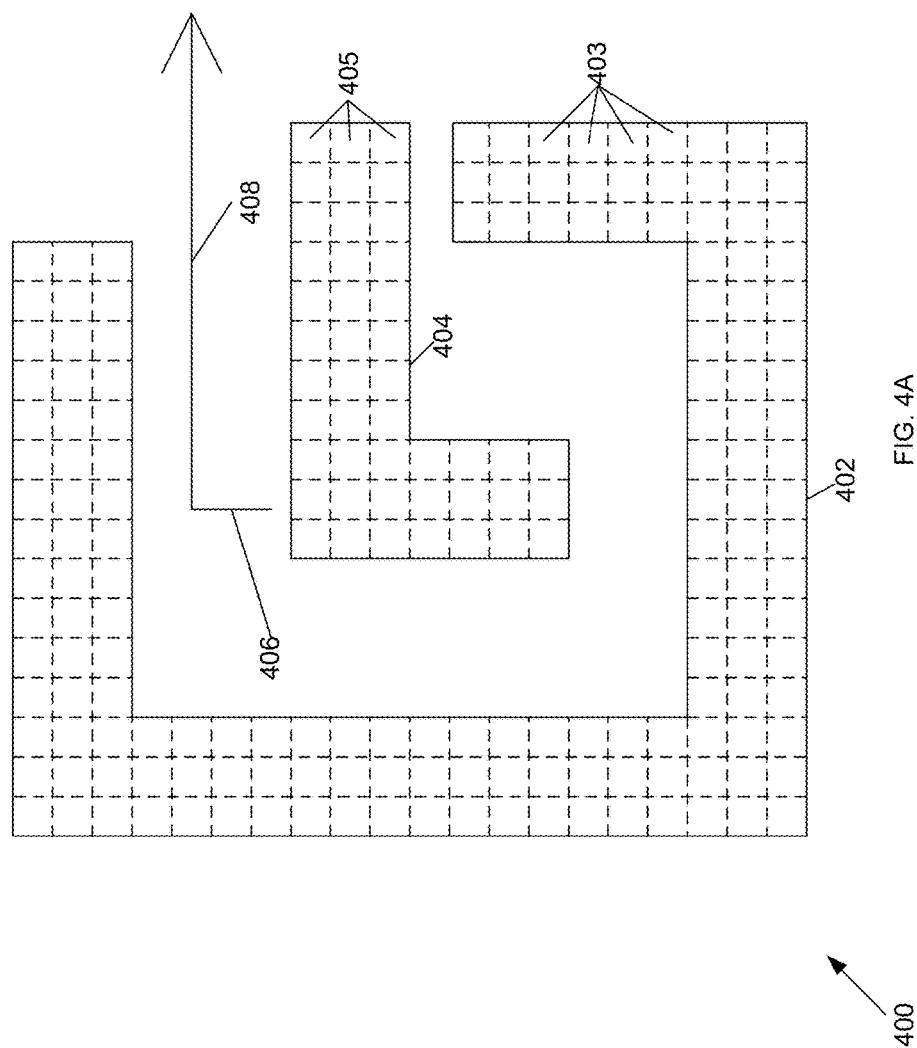

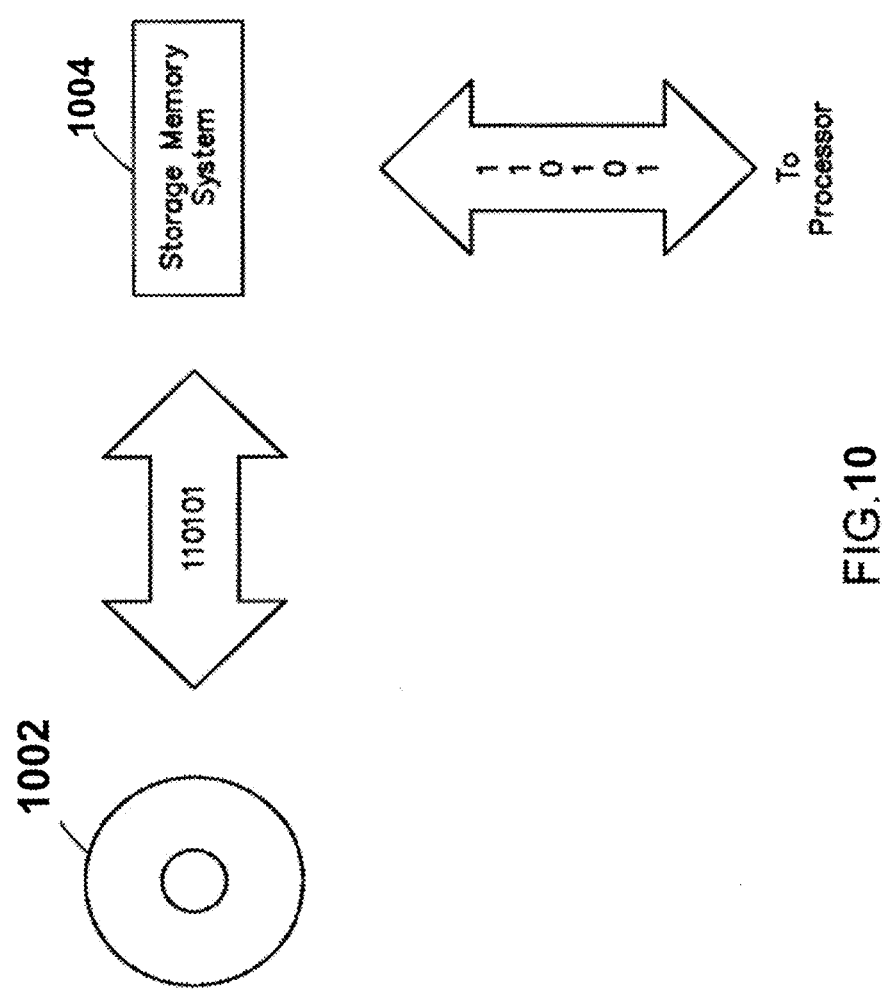

MULTI-PART COUNTING SYSTEM FOR THREE-DIMENSIONAL PRINTED PARTS

BACKGROUND

1. Field of the Disclosure

The present disclosure relates generally to three dimensional (3D) printing and processing of 3D printed parts. More specifically, embodiments of this disclosure relate to methods and systems for the identification and counting of 3D printed parts in a user-provided model.

2. Description of Background 3D printing generally refers to the process of creating a 3D part from a 3D model by printing material layers to create the 3D part. A 3D model from which a 3D part is printed may be any 3D-printable digital model such as a computer-aided design (CAD) model. On-demand 3D printing of custom 3D models has become possible in recent years. For example, there are online services that offer custom 3D printing services. For instance, the online provider Shapeways (www.shapeways.com) provides custom 3D printing services wherein customers may upload custom 3D models, select materials and order 3D printed parts to be built from the selected materials.

SUMMARY

Aspects and embodiments disclosed herein provide a system and method for identifying the different 3D printed parts of a user-provided model. By analyzing a user-provided model with both a test that determines the escapability of individual pairs of pieces in the model and a test that simultaneously compares individual pieces against all other pieces in the model, the number and identification of different parts (discrete and/or interlocking) in the user-provided model may be accurately determined. By correctly identifying the different parts of a user uploaded mode (discrete or interlocking), before the model has been printed, a manufacturer may be able to more accurately and efficiently identify, print, price, clean, tag, and/or assemble the parts of a printed model. Such capability may be beneficial for an online retailer of custom 3D print services.

At least one aspect of the invention is directed to a 3D printing system comprising an interface, a database, a production planning system in communication with the interface and the database and configured to receive a model provided by a user, the model including a plurality of pieces, and a multi-part counting system in communication with the production planning system and configured to receive, from the production planning system, the user-provided model, calculate a bounds of the user-provided model, perform a first test on each of the plurality of pieces of the model to determine if each piece can escape the bounds of the model individually in relation to each other piece of the plurality of pieces in the model, perform a second test on each of the plurality of pieces of the model to determine if each piece can escape the bounds of the model simultaneously in relation to all other pieces of the plurality of pieces in the model, and output, based on the first test and the second test, a determination of different discrete and interlocking parts in the model to the production planning system.

According to one embodiment, in performing the first test, the multi-part counting system is further configured to determine if a first piece of the model is able to escape the bounds of the model individually in relation to a second piece of the model, and in response to a determination that the first piece is not able to escape the bounds of the model individually in relation to the second piece of the model, identify the first piece and the second piece as interlocking pieces. In one embodiment, in determining if the first piece of the model is able to escape the bounds of the model individually in relation to the second piece of the model, the multi-part counting system is further configured to partition the first piece into smaller segments, attempt to move, via an escape path, each smaller segment of the first piece outside the bounds of the model, determine if, along the escape path, any of the smaller segments of the first piece intersect the second piece, and in response to a determination that at least one of the smaller segments of the first piece intersects the second piece, identify that the first piece of the model is not able to escape the bounds of the model in relation to the second piece.

According to one embodiment, the smaller segments are voxels. In another embodiment, the smaller segments are triangular patches. In one embodiment, the escape path is one of a simple and complex escape path.

According to another embodiment, in response to a determination that the first piece is able to escape the bounds of the model individually in relation to the second piece of the model, identify the first piece and the second piece as discrete pieces. In one embodiment, in response to a determination that the first piece is not able to escape the bounds of the model individually in relation to the second piece of the model, the multi-part counting system is further configured to combine the first piece and the second piece into a first interlocking part.

According to one embodiment, in performing the first test, the multi-part counting system is further configured to determine if a third piece of the model is able to escape the bounds of the model individually in relation to the first piece, the second piece, and a fourth piece of the model, determine if the fourth piece of the model is able to escape the bounds of the model individually in relation to the first piece, the second piece, and the third piece, in response to a determination that the third piece is able to escape the bounds of the model individually in relation to the first piece, the second piece, and the fourth piece, identify the third piece as a first discrete piece, and in response to a determination that the fourth piece is able to escape the bounds of the model individually in relation to the first piece, the second piece, and the third piece, identify the fourth piece as a second discrete piece.

According to one embodiment, in performing the second test, the multi-part counting system is further configured to determine if the first interlocking part can escape the bounds of the model simultaneously in relation to both the third piece and the fourth piece in the model, and in response to a determination that the first interlocking part can escape the bounds of the model simultaneously in relation to both the third piece and the fourth piece in the model, identify that the first interlocking part is discrete from the third piece and the fourth piece. In one embodiment, in performing the first test, the multi-part counting system is further configured to determine if a fifth piece of the model is able to escape the bounds of the model individually in relation to the first piece, the second piece, the third piece, and the fourth piece of the model, and in response to a determination that the fifth piece is able to escape the bounds of the model individually in relation to the first piece, the second piece, the third piece, and the fourth piece, identify the fifth piece as a third discrete piece.

According to another embodiment, in performing the second test, the multi-part counting system is further configured to determine if the first discrete piece can escape the bounds of the model simultaneously in relation to both the second discrete piece and the third discrete piece in the model, and in response to a determination that the first discrete piece cannot escape the bounds of the model simultaneously in relation to both the second discrete piece and the third discrete piece in the model, identify the third piece, the fourth piece, and the fifth piece as interlocking pieces. In one embodiment, in response to a determination that the first discrete piece cannot escape the bounds of the model simultaneously in relation to both the second discrete piece and the third discrete piece in the model, the multi-part counting system is further configured to combine the third piece, the fourth piece, and the fifth piece into a second interlocking part.

According to one embodiment, in response to a determination that the first discrete piece can escape the bounds of the model simultaneously in relation to both the second discrete piece and the third discrete piece in the model, identify the third piece, the fourth piece, and the fifth piece as discrete parts. In another embodiment, the determination of the different discrete and interlocking parts in the model output by the multi-part counting system includes an identification of a number of discrete parts and an identification of a number of interlocking parts in the model.

According to another embodiment, the production planning system is further configured to generate a plurality of individual files, each file corresponding to one identified discrete part or one identified interlocking part. In one embodiment, the production planning system is further configured to store each of the plurality of individual files in the database. In another embodiment, the 3D printing system further comprises a 3D printer in communication with the production planning system, wherein the production planning system is further configured to transmit at least one of the plurality of individual files to the printer for printing of the corresponding part.

According to one embodiment, the production planning system is further configured to compare each of the plurality of individual files to a plurality of files previously stored in the database corresponding to previously printed parts and only transmit an individual file to the printer if the individual file does not match any of the plurality of files previously stored in the database.

Another aspect of the invention is directed to a method for identifying the different 3D printed parts of a user-uploaded model including a plurality of pieces, the method comprising receiving, with a production planning system of a 3D printing system, the user-uploaded model, calculating, with a multi-part counting system, a bounds of the user-provided model, performing, with the multi-part counting system, a first test on each of the plurality of pieces of the model to determine if each piece can escape the bounds of the model individually in relation to each other piece of the plurality of pieces in the model, performing, with the multi-part counting system, a second test on each of the plurality of pieces of the model to determine if each piece can escape the bounds of the model simultaneously in relation to all other pieces of the plurality of pieces in the model, and providing, with the multi-piece counting system, a determination of different discrete and interlocking parts in the model to the production planning system.

According to one embodiment, performing the first test comprises determining if a first piece of the model is able to escape the bounds of the model in relation to a second piece of the model, and in response to a determination that the first piece is not able to escape the bounds of the model in relation to the second piece of the model, identifying the first piece and the second piece as interlocking pieces and combining the first piece and the second piece into a first interlocking part. In another embodiment, determining if the first piece of the model is able to escape the bounds of the model in relation to the second piece of the model comprises partitioning the first piece into smaller segments, attempting to move, via an escape path, each smaller segment of the first piece outside the bounds of the model, determining if, along the escape path, any of the smaller segments of the first piece intersects the second piece, and in response to a determination that one of the smaller segments of the first piece intersects the second piece, identifying that the first piece of the model is not able to escape the bounds of the model in relation to the second piece.

According to another embodiment, performing the first test further comprises determining if a third piece of the model is able to escape the bounds of the model individually in relation to the first piece, the second piece, a fourth piece, and a fifth piece of the model, determining if the fourth piece of the model is able to escape the bounds of the model individually in relation to the first piece, the second piece, the third piece, and the fifth piece of the model, determining if the fifth piece of the model is able to escape the bounds of the model individually in relation to the first piece, the second piece, the third piece, and the fourth piece of the model, in response to a determination that the third piece is able to escape the bounds of the model individually in relation to the first piece, the second piece, the fourth piece, and the fifth piece, identifying the third piece as a first discrete piece, in response to a determination that the fourth piece is able to escape the bounds of the model individually in relation to the first piece, the second piece, the third piece, and the fifth piece, identifying the fourth piece as a second discrete piece, and in response to a determination that the fifth piece is able to escape the bounds of the model individually in relation to the first piece, the second piece, the third piece, and the fourth piece, identifying the fifth piece as a third discrete piece.

According to one embodiment, performing the second test comprises determining if the first interlocking part can escape the bounds of the model simultaneously in relation to each of the third piece, the fourth piece, and the fifth piece in the model, and in response to a determination that the first interlocking part can escape the bounds of the model simultaneously in relation to each of the third piece, the fourth piece, and the fifth piece in the model, identifying that the first interlocking part is discrete from the third piece, the fourth piece, and the fifth piece.

According to another embodiment, performing the second test further comprises determining if the first discrete piece can escape the bounds of the model simultaneously in relation to both the second discrete piece and the third discrete piece in the model, in response to a determination that the first discrete piece cannot escape the bounds of the model simultaneously in relation to both the second discrete piece and the third discrete piece in the model, identifying the third piece, the fourth piece, and the fifth piece as interlocking pieces and combining the third piece, the fourth piece, and the fifth piece as a second interlocking part, and in response to a determination that the first discrete piece can escape the bounds of the model simultaneously in relation to the second discrete piece and the third discrete piece in the model, identifying the third piece, the fourth piece, and the fifth piece as discrete parts.

According to one embodiment, providing the determination of the different discrete and interlocking parts in the model to the production planning system comprises providing an identification of a number of discrete parts and an identification of a number of interlocking parts in the model. In another embodiment, the method further comprises subdividing, with the production planning system, the model into a plurality of individual files, each file corresponding to one discrete part or one interlocking part, and transmitting at least one of the plurality of the individual files to a 3D printer for printing. In one embodiment, the first test is performed before the second test.

At least one aspect of the invention is directed to a 3D printing system comprising an interface, a database, a production planning system in communication with the interface and the database and configured to receive a 3D model provided by a user, the 3D model including a plurality of parts, a 3D printer in communication with the production planning system and configured to receive printing instructions with regard to the plurality of parts from the production planning system, and means for identifying a number of discrete parts in the 3D model, for identifying a number of interlocking parts in the 3D model, and for providing the number of discrete parts and the number of interlocking parts to the production planning system.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 4A illustrates one example of a complex escape path according to aspects of the present invention;

FIG. 10 is a block diagram of a computer data storage system with which various embodiments of the invention may be practiced.

DETAILED DESCRIPTION

Figure 1:
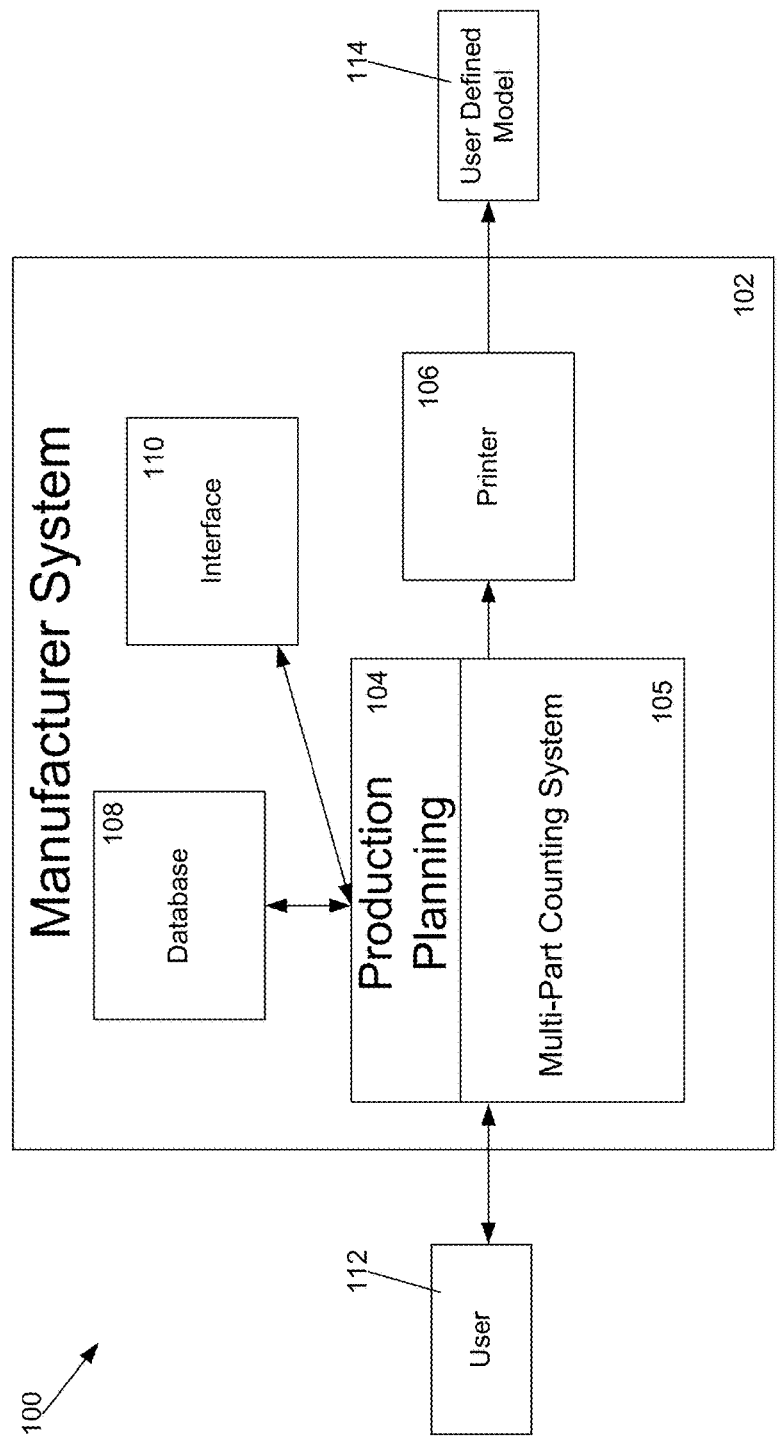
FIG. 1 is a block diagram of a 3D printing system according to aspects of the present invention.

In a typical on-demand 3D printing process, a 3D model, such as a custom model (e.g., a CAD model), is uploaded by a customer to a manufacturer. The manufacturer may analyze the 3D model to determine whether it is 3D-printable. If the model is printable on a 3D printer in a particular material type, the manufacturer may accept the 3D model and queue the model for production planning. A production planning step includes planning 3D print runs, i.e. the build of 3D models that are indicated for printing. After production planning, one or more 3D parts based on the 3D model may be scheduled to be printed inside a tray. Many times, a number of parts relating to one or more models may be printed within a single tray.

Applicant has appreciated that it may be desirable for the manufacturer to identify the number of parts (discrete or interlocking) a user-provided model will produce upon being printed. As defined herein, a "part" is a single printed entity that cannot be pulled apart. For example, a chainmail glove is composed of many interlocking pieces; however, it only includes one "part" as the interlocking pieces cannot be pulled apart. As defined herein, a "discrete part" is a single printed entity that includes a single discrete piece. As also defined herein, an "interlocking part" is a single printed entity that includes multiple interlocking pieces. As also defined herein, a "piece" is an object in a user-provided model that, by itself, can make up a "discrete part" or in combination with other pieces, can make up an "interlocking part".

By identifying the number of parts (discrete or interlocking) a user uploaded model will produce upon being printed, an accurate per-part cost of printing the uploaded model can be determined. Also, some manufacturers do not possess appropriate technology to print interlocking parts. Therefore, by identifying that the printing of a user uploaded model will result in interlocking parts, the manufacturer can determine if printing of the user uploaded model is even possible.

Traditional processes for 3D printing typically include the identification and processing of different parts of a user uploaded model after the model has actually been printed. Such processes are typically inefficient and error prone, and some involve manual steps that must be performed by an operator. By correctly identifying the different parts of a user uploaded model (discrete or interlocking) before the model has been printed, a manufacturer may be able to more accurately and efficiently identify, print, clean, tag, price, and/or assemble the parts of a printed model. Accordingly, aspects and embodiments as disclosed herein provide a system and method for identifying the different 3D printed parts of a user uploaded model.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

FIG. 1 is a block diagram of a 3D printing system 100 according to aspects of the present invention. The 3D printing system 100 includes a manufacturer system 102 that includes a production planning system 104, a 3D printer 106, a database 108, and an interface 110. The production planning system 104 includes a multi-part counting system 105 and is in communication with the database 108, the interface 110, and the printer 106.

In one embodiment, the production planning system 104 is executed on a server or processor of the manufacturer system 102; however, in other embodiments, the production planning system 104 may be operated on another appropriate computer system in the manufacturer system 102. In one embodiment, the multi-part counting system 105 is executed on the same system as the production planning system 104 (e.g., on the same server or processor); however, in other embodiments, the production planning system 104 and the multi-part counting system may be executed on different systems.

The manufacturer system 102 is configured to communicate with a user or customer 112 via an interface 113. The user 112 provides a model to the manufacturer system 102. In one embodiment, the user 112 provides the model to the manufacturer system 102 directly. For example, a model may be uploaded directly to the production planning system 104 from a flash drive (or some other storage medium) or from a computer system via a Local Area Network (LAN). In another embodiment, the user 112 transmits the model to the manufacturer system 102 from a computer system via a network (e.g., via the internet, some other communication network, or some other combination of networks).

Upon receiving the model from the user 112 (e.g., either directly or via a transmission from the user 112), the production planning system 104 determines if the model is appropriate for 3D printing (i.e., the model is capable of being printed by the printer 106). If the model is not appropriate for 3D printing, the production planning 104 system informs the user 112 (via a transmission back to the user 112 or via the interface 110) that the model is not appropriate for 3D printing and has been rejected. If the model is appropriate for 3D printing, the production planning system 104 provides the model to the multi-part counting system 105. The multi-part counting system 105 identifies the different parts (discrete and/or interlocking) of the model. Operation of the multi-part counting system 105 will be discussed in greater detail below.

In one embodiment where the manufacturer system 102 is incapable of producing interlocking parts and in response to the multi-part counting system 105 identifying that the model includes at least one interlocking part, the production planning system 104 informs the user 112 (via a transmission back to the user 112 or via the interface 110) that the manufacturer system 102 is not able to print the model.

The multi-part counting system 105 may provide the identification of the different parts of the model to the manufacturer. In one embodiment, the multi-part counting system stores the identification of the different parts in the database 108. In another embodiment, the multi-part counting system displays the different parts of the model to the manufacturer via the interface 110.

After the multi-part counting system 105 identifies the different parts of the model, the production planning system 104 plans the build (i.e., the print runs) of the 3D model. For example, the production planning system schedules the different parts (discrete and interlocking), identified by the multi-part counting system 105, to be built inside certain trays. Such identification information for each of the different parts may be stored in a database (e.g., database 108). The production planning system 104 may store the planned build of the 3D model in the database 108 and/or may provide the planned build to the manufacturer via the interface 110. The production planning system 104 also provides the planned build of the 3D model to the printer 106. The printer 106 prints the parts (identified by the multi-part counting system 105) of the user defined model 114. After the parts of the user defined model 114 are printed, the parts may be cleaned, tagged, priced, and/or assembled into the user defined model 114 if necessary.

By correctly identifying the different parts of the user uploaded model 114 (discrete and/or interlocking), before the model 114 has been printed, a manufacturer may be able to more accurately and efficiently identify, print, clean, price, tag, and/or assemble the parts of a printed model.

Figure 2:
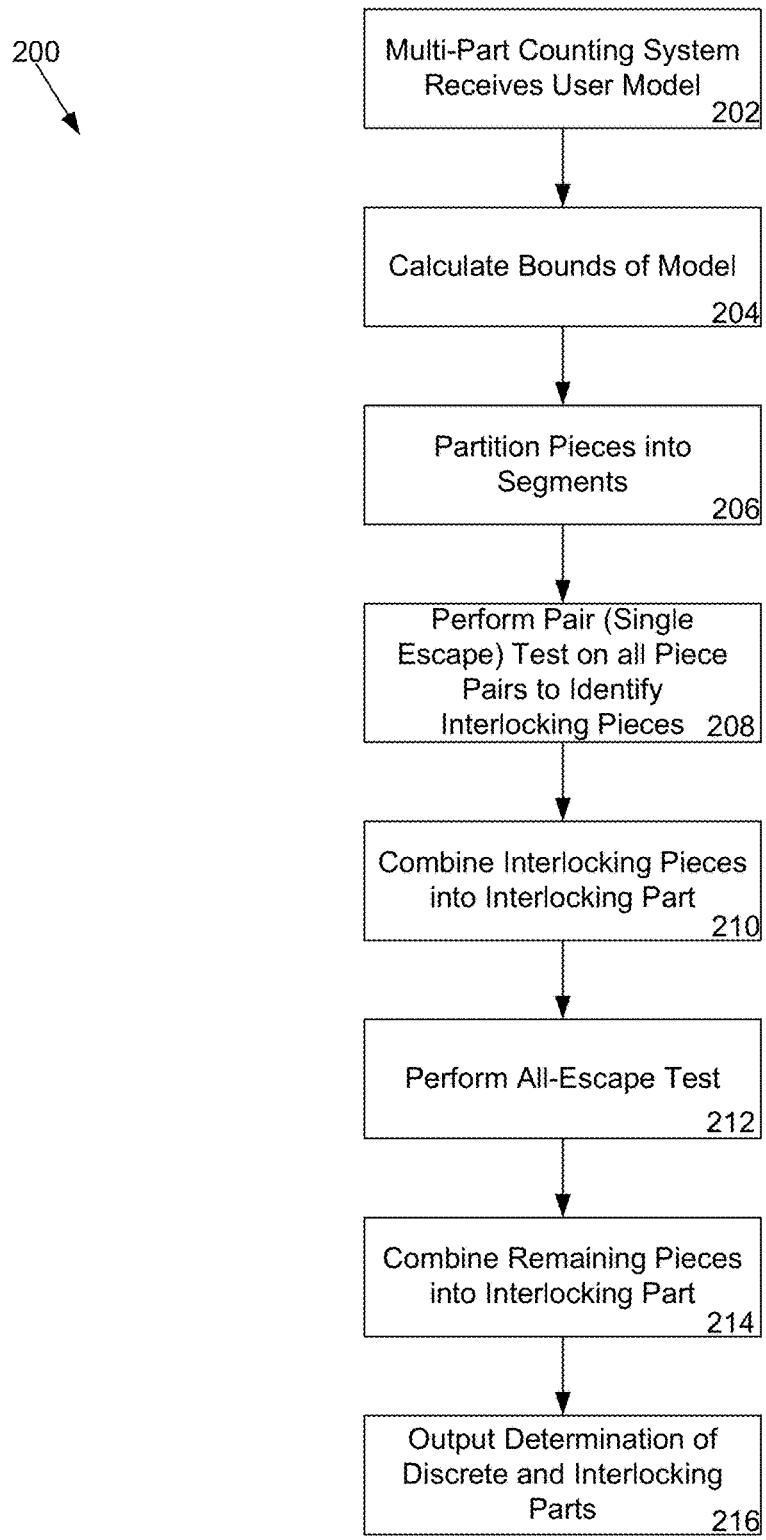
FIG. 2 is a flow chart illustrating a process for identifying the different 3D printed parts of a user uploaded model according to aspects of the present invention.

FIG. 2 is a flow chart 200 illustrating one embodiment of a process for identifying the different 3D printed parts of a user uploaded model by the multi-part counting system 105. At block 202, the multi-part counting system 105 receives a user-provided model (e.g., as discussed above) from the production planning system 104. The user-provided model may include any number of discrete and/or interlocking pieces (i.e., any number of discrete and/or interlocking parts).

At block 204, the multi-part counting system 105 calculates the bounds of the user-provided model. In one embodiment, the multi-part counting system 105 calculates the bounds (i.e., the maximum distance the user-provided model extends in any direction) of the user-provided model by generating a containment box that bounds all of the pieces in the model; however, in other embodiments, the bounds of the user-provided model may be calculated in some other way.

At block 206, the multi-part counting system 105 partitions the pieces of the model into smaller segments. For example, in one embodiment, the multi-part counting system 105 translates each piece in the model into a voxelized object. A voxelated object is an object that is subdivided into 3D volumetric pixels (e.g., cubes). According to another embodiment, the multi-part counting system 105 subdivides the pieces of the model into smaller sections by partitioning each piece of the model into triangular patches, thereby forming a mesh of triangular patches. In other embodiments, the pieces of the user-provided model may be partitioned using any other appropriate method.

At block 208, a pair (i.e., a single escape) test is performed on the pieces of the user-provided model. In the pair (i.e., single escape) test, each piece of the model is individually tested against each other piece in the model to determine if the pieces are discrete or interlocking. If a pair of pieces is able to be separated from each other without the pieces intersecting (i.e., the pair of pieces are able to escape one another via a simple or complex path), then the multi-part counting system 105 identifies the pieces as being discrete pieces. If a pair of pieces is not able to be separated without the pieces intersecting one another (i.e., not able to escape one another), then the multi-part counting system 105 identifies the pieces as interlocking.

If a first piece of a pair of pieces is able to move, in a single direction, to a location outside the bounds of the model (e.g., outside the containment box) without intersecting the second piece of the pair, the first piece is considered to escape the second piece via a simple escape path. In a voxelized space, a simple escape path may be in one of 26 possible directions (excluding 0, 0, 0).

Figure 3:
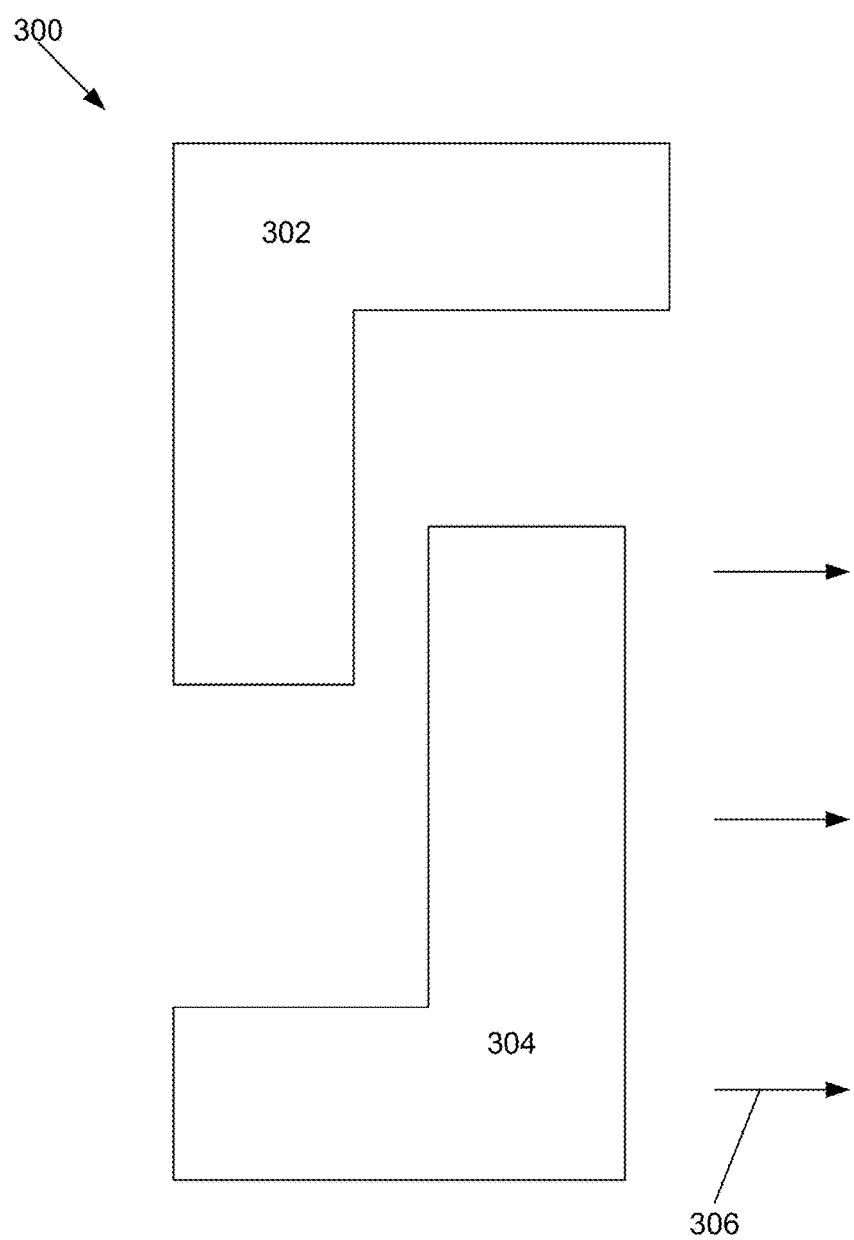
FIG. 3 illustrates one example of a simple escape path according to aspects of the present invention.

FIG. 3 illustrates one example of a simple escape path. In particular, FIG. 3 shows a user-provided model 300 that includes a first piece 302 and a second piece 304. The second piece 304 is able to move, in a single cardinal direction 306 to a location outside the bounds of the model 300 without intersecting the first piece 302. Accordingly, the second piece 302 is said to escape the first piece 302 via a simple escape path.

If a first piece is able to move, in more than one cardinal direction, to a location outside the bounds of the model (e.g., outside the containment box) without intersecting the second piece of the pair, the first piece is considered to escape the second piece via a complex escape path. FIG. 4A illustrates one example of a complex escape path. In particular, FIG. 4A shows a user-provided model 400 that includes a first piece 402 and a second piece 404. The second piece 404 is able to move, in a first direction 406 and a second direction 408, to a location outside the bounds of the model 400 without intersecting the first piece 402. Accordingly, the second piece 404 is said to escape the first piece 402 via a complex escape path.

When performing the pair (i.e., single escape) test on pieces in a user-provided model, the multi-part counting system 105 may, according to at least one embodiment, test each segment of a piece individually. In one embodiment where the pieces are partitioned into volumetric cubes, the multi-part counting system 105 checks each cube of a first piece individually to determine if it can escape (via a simple and/or complex path) every cube of a second piece. If every cube of the first piece cannot escape every cube of the second piece via the same path, then the first piece cannot escape the second piece. For example, as shown in FIG. 4A, the first piece 402 is partitioned into 3D volumetric cubes 403 and the second piece 404 is partitioned into 3D volumetric cubes 405. For ease of illustration, the volumetric cubes 403, 405 are shown as 2D squares. As each cube 405 of the second piece 404 is able to move in the first direction 406 and the second direction 408 to a location outside the bounds of the model 400 without intersecting any of the cubes 403 of the first piece 402, the second piece 404 is said to escape the first piece 402 via a complex escape path.

Figure 4B:
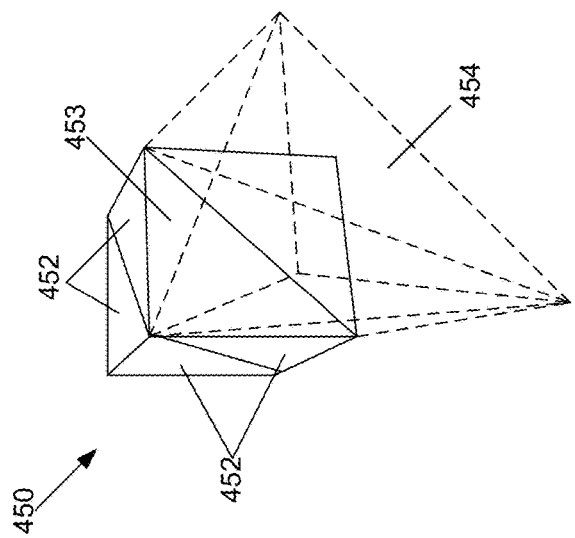
FIG. 4B illustrates one example of a piece of a user-provided model partitioned into triangular patches according to aspects of the present invention.

In another embodiment, where the pieces are partitioned into triangular patches, the multi-part counting system 105 generates a 3D extension of each triangular patch that describes the extrusion of the triangle along an escape path. In one embodiment, the 3D extension resembles a prism extending from the triangle in the direction(s) of the escape. If a corresponding prism of any of the triangular patches of a first piece intersects a second piece, then the first piece cannot escape the second piece. For example, FIG. 4B illustrates one example of piece (i.e., a cube 450) of a user-provided model partitioned into triangular patches 452. The multi-part counting system 105 generates a 3D prism 454 extending from one of the triangular patches 453 that describes the extrusion of the triangular patch 453 along an escape path. If the prism 454 can extend to a location outside the bounds of the model without intersecting any other pieces, then the triangular patch 453 is said to escape the other pieces of the model. While only one prism is shown in FIG. 4B, the multi-part counting system 105 generates a prism for each triangular patch 452 of the cube 450 and tests the escapability of each prism. If each prism of the cube 450 successfully extends to a position outside the bounds of the model without intersecting another piece of the model, then the cube 450 is identified as successfully escaping the other piece of the model.

Upon completing the pair (i.e., single escape) test on all piece pairs in the user-provide model, the multi-part counting system 105 is able to generate a list of discrete and interlocking pieces. At block 210, the multi-part counting system 105 combines interlocking pieces into single interlocking parts.

Figure 5:
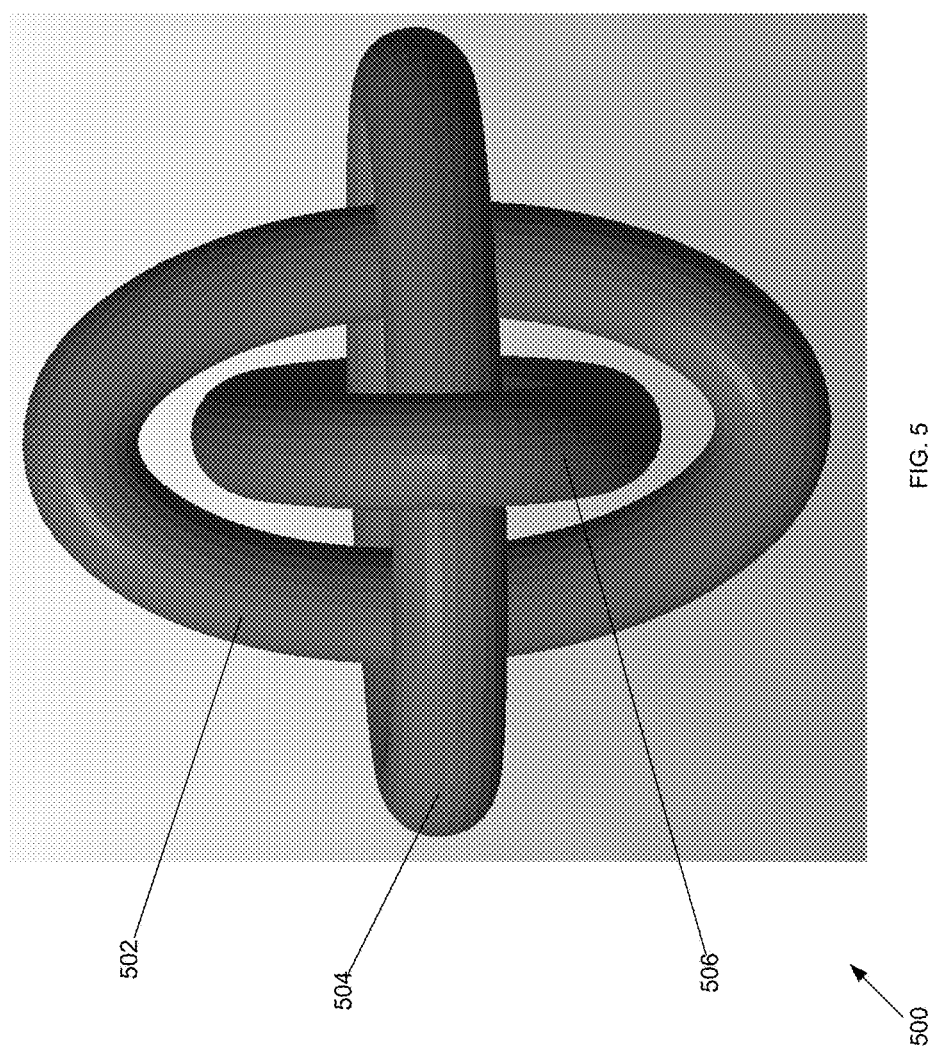
FIG. 5 illustrates one embodiment of a user-provided model according to aspects of the present invention.

Applicant has appreciated that there are certain situations, where the pair (i.e., single escape) test will incorrectly identify pieces as discrete when they are actually interlocking. For example, FIG. 5 illustrates a user-provided model 500 that, if analyzed under the pair test, will incorrectly identify the pieces as discrete. For example, the model 500 includes a first piece 502, a second piece 504, and a third piece 506. If each piece pair is tested for escapability, the first piece 502 will escape from the second piece 504, the first piece 502 will escape from the third piece 506, and the second piece 504 will escape from the third piece 506. However, despite the escapability results of the pair test, the pieces 502, 504, 206 of the model 500, as seen in FIG. 5, are actually interlocking.

Accordingly, to avoid such an incorrect identification of discrete and interlocking pieces in a user-provided model, at block 212, an all-escape test may also be performed on the user-provided model. In the all-escape test, each piece identified as discrete in the pair (i.e. single escape) test and each interlocking part (i.e., combination of interlocking pieces) identified in the pair test is tested against all other pieces/interlocking parts in the model to determine if the piece/interlocking part can escape. At block 214, any piece/interlocking part that is unable to escape from the other pieces/interlocking parts of the model are combined together, via their bounds into an interlocking part.

Figure 6:
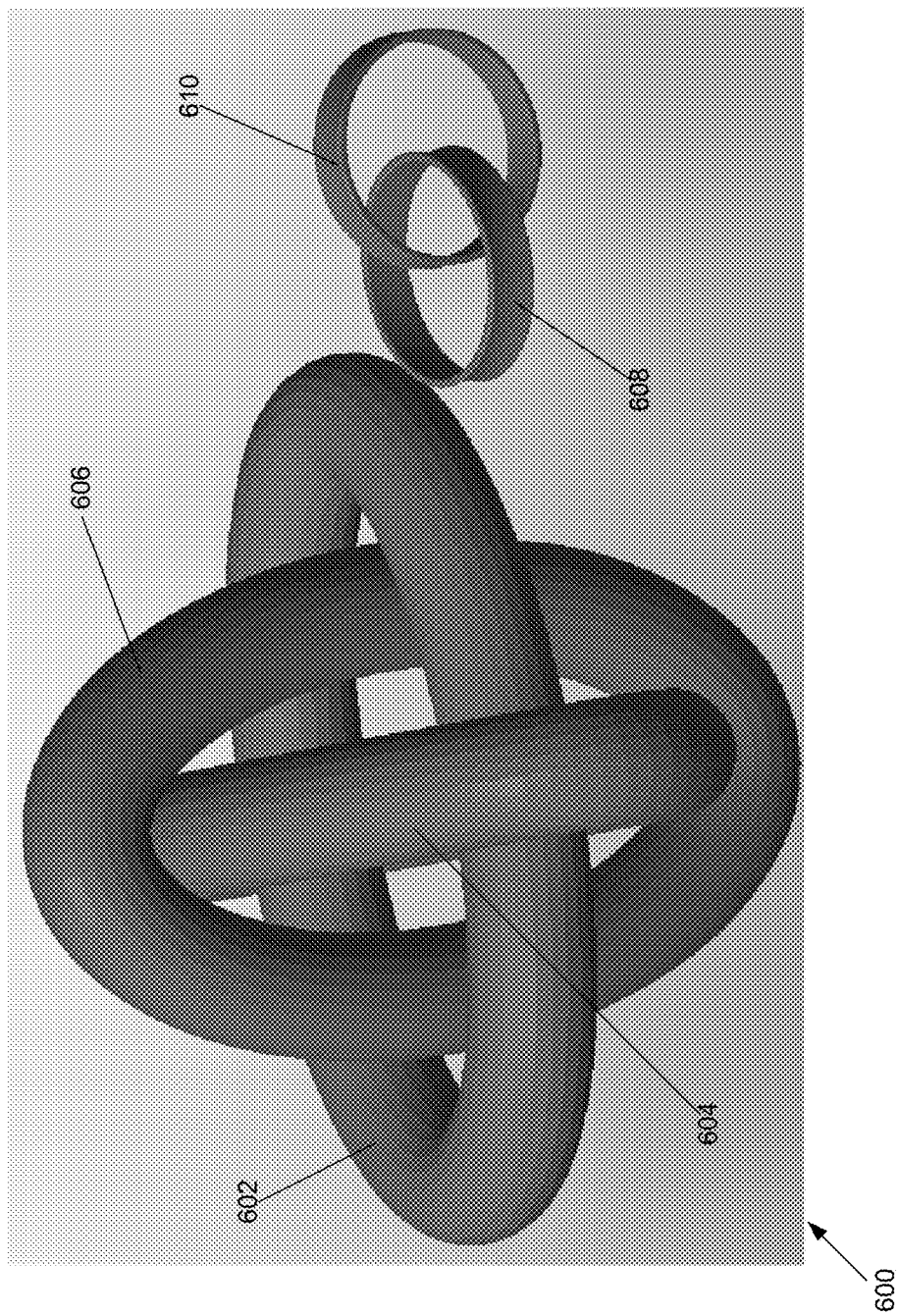
FIG. 6 illustrates one embodiment of a user-provided model according to aspects of the present invention.

For example, FIG. 6 illustrates a user-provided model 600 that includes a first piece 602, a second piece 604, a third piece 606, a fourth piece 608, and a fifth piece 610. Upon performing the pair (i.e., single escape) test on the model 600, the multi-part counting system 105 determines that the fourth piece 608 and the fifth piece 610 are interlocking and combines the fourth piece 608 and the fifth piece 610 into an interlocking part. As discussed above, based on the results of the pair test, the multi-part counting system 105 also incorrectly identifies the first piece 602, the second piece 604, and the third piece 606 as being discrete.

In the all-escape test of block 212, the first piece 602, the second piece 604, the third piece 606, and the interlocking part including the fourth piece 608 and the fifth piece 610 are tested against one another to determine which pieces/interlocking parts can escape from the model 600 without intersecting another piece/interlocking part. As seen in FIG. 6, the interlocking part including the fourth part 608 and the fifth part 610 is able to simply escape from the other pieces 602, 604, and 606. However, the first piece 602, the second piece 604, and the third piece 606 are not able to escape each other. As such, at block 214, the multi-part counting system 105 logically combines the first piece 602, the second piece 604, and the third piece 606 together, via their bounds, into an interlocking part.

At block 216, the multi-part counting system 105 outputs a determination of the number of discrete and/or interlocking parts within the user-provided model it analyzed under the pair (i.e., all escape) test of block 208 and the all-escape test of block 212. For example, upon analyzing the model 600 of FIG. 6, the multi-part counting system 105 outputs a determination of two interlocking parts (i.e., a first interlocking part including the first piece 602, the second piece 604, and the third piece 606, and a second interlocking part including the fourth piece 608 and the fifth piece 610).

In one embodiment, the determination of the number of discrete and/or interlocking parts within the user-provided model is provided, by the multi-part counting system 105, to the production planning system 104. In one embodiment, the production planning system 104 provides the determination to a user via the interface 110. In another embodiment, the production planning system 104 stores the user-provided model and/or the discrete/interlocking part determination from the multi-part counting system 105 in the database 108.

Applicant has appreciated that without first utilizing the pair (i.e., single escape) test to identify interlocking pieces, the all-escape test may incorrectly identify certain pieces as interlocking. For example, if the model 600 of FIG. 6 is analyzed with the all-escape test without first identifying, with the pair test, the fourth piece 608 and the fifth piece 610 as interlocking, the multi-part counting system 105 identifies that the first piece 602, the second piece 604, and the third piece 606 cannot escape one another and that the fourth piece 608 cannot escape the fifth piece 610. Accordingly, the multi-part counting system 105 determines that the first piece 602, the second piece 604, the third piece 606, the fourth piece 608, and the fifth piece 610 cannot escape from the model 600 and the process would incorrectly combine all five of these pieces together into one interlocking part. To avoid such errors, it may be beneficial to analyze each model first with the pair test, and then with the all-escape test.

Figure 7:
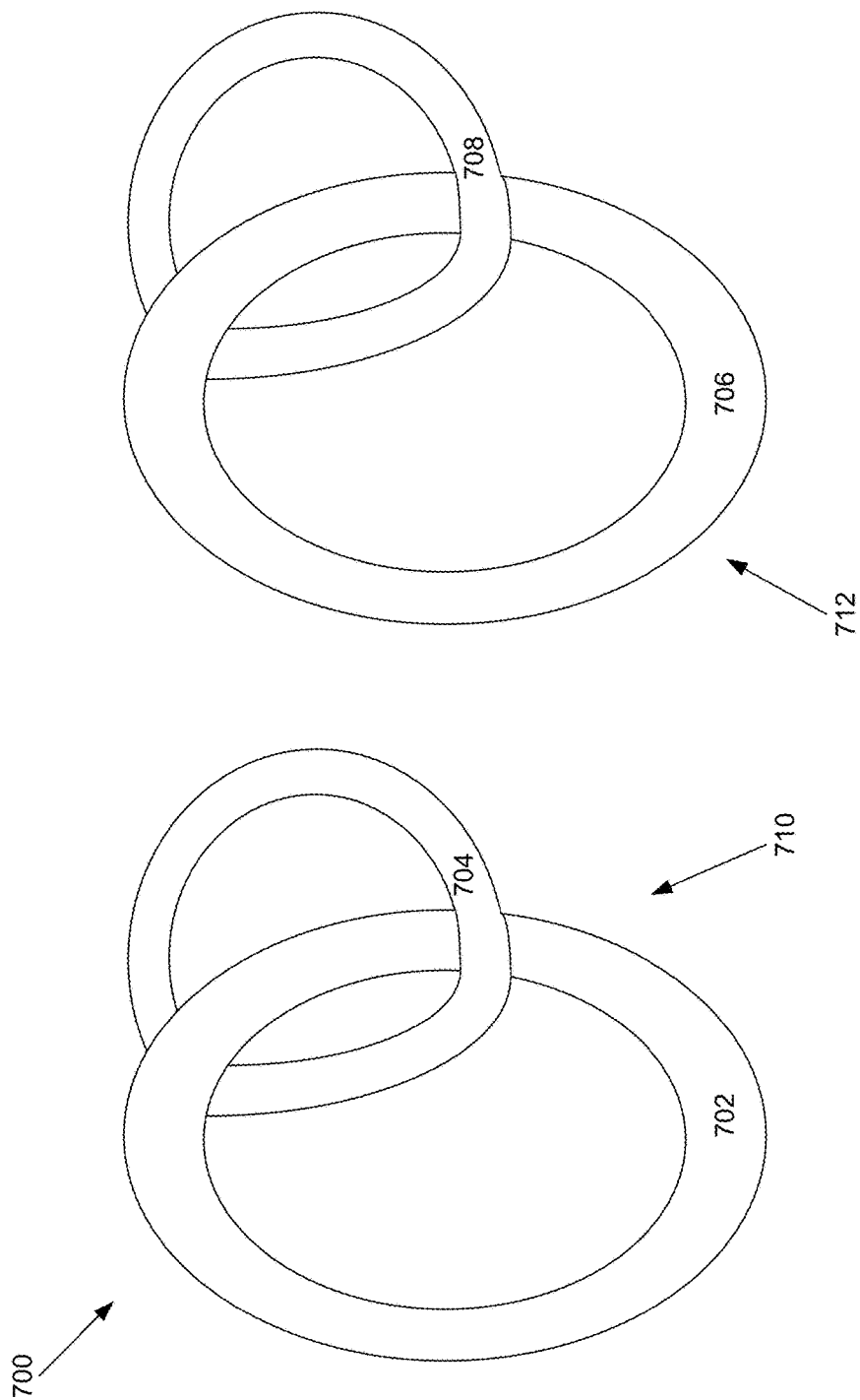
FIG. 7 illustrates one embodiment of a user-provided model according to aspects of the present invention.

Additional examples of the pair (i.e., single escape) test analysis (e.g., at block 208) and the all-escape test analysis (e.g., at block 212) is described below with regard to FIGS. 7 and 8. FIG. 7 illustrates one embodiment of a user-provided model 700 including a first piece 702, a second piece 704, a third piece 706, and a fourth piece 708. During the pair (i.e., single escape) test analysis, the multi-part counting system 105 individually tests each piece of the model 700 against each other piece of the model 700 for escapability and determines that the first piece 702 and the second piece 704 do not escape each other, the first piece 702 and the third piece 706 do escape each other, the first piece 702 and the fourth piece 708 do escape each other, the second piece 704 and the third piece 706 do escape each other, the second piece 704 and the fourth piece 708 do escape each other, and the third piece 706 and the fourth piece 708 do not escape each other.

Responsive to this determination, the multi-part counting system 105 determines that the first piece 702 and the second piece 704 are interlocking and that the third piece 706 and the fourth piece 708 are interlocking. As such, the multi-part counting system combines the first piece 702 and the second piece 704 into a first interlocking part 710 and the third piece 706 and the fourth piece 708 into a second interlocking part 712. During the all-escape test analysis, the multi-part counting system analyzes the escapability of the first interlocking part 710 and the second interlocking part 712 and determines that the first interlocking part 710 can escape simply from the second interlocking part 712. As a result, the multi-part counting system 105 outputs an identification of two interlocking parts.

Figure 8:
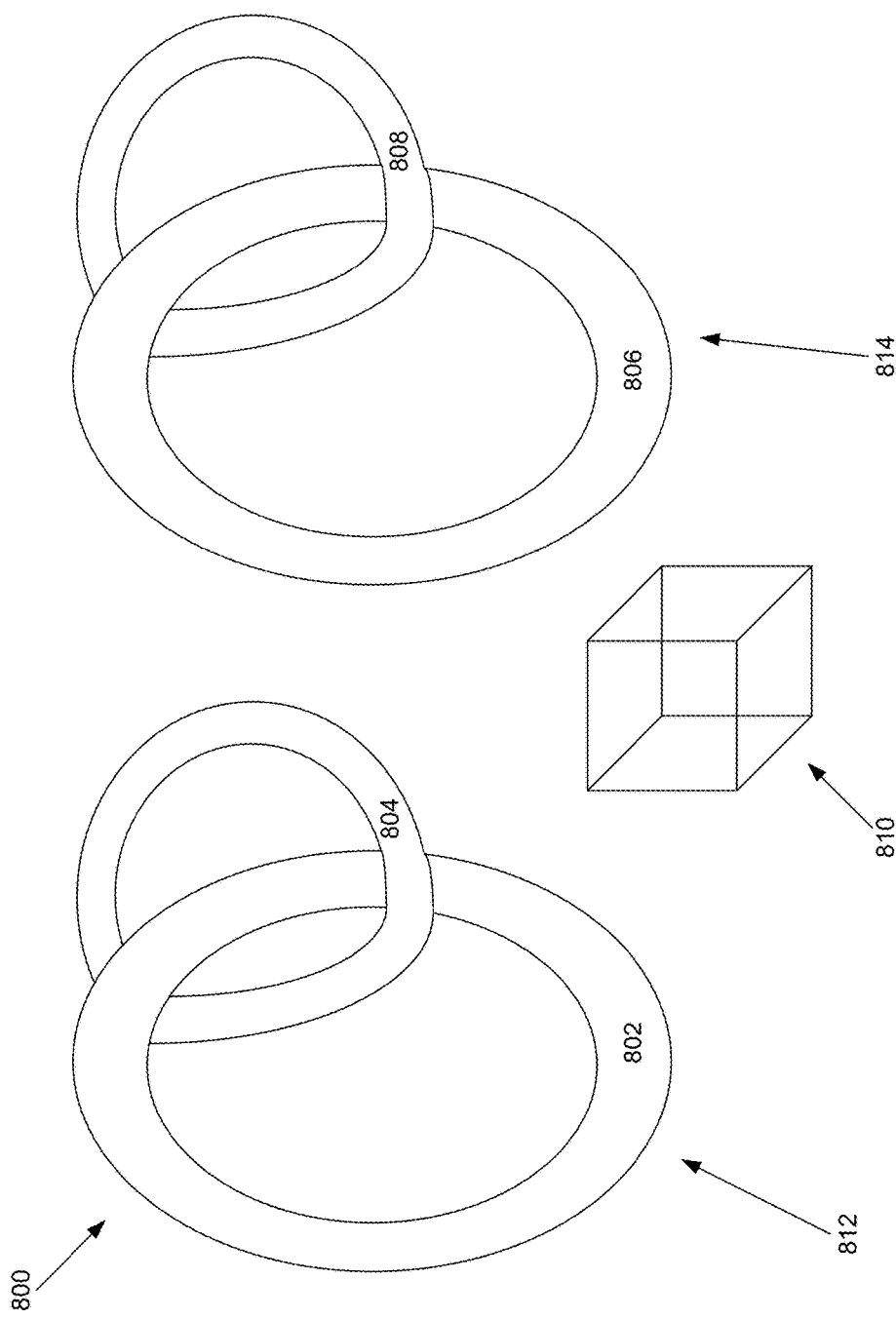
FIG. 8 illustrates one embodiment of a user-provided model according to aspects of the present invention.

FIG. 8 illustrates another embodiment of a user-provided model 800 including a first piece 802, a second piece 804, a third piece 806, a fourth piece 808, and a fifth piece 810. During the pair (i.e., single escape) test analysis, the multi-part counting system 105 individually tests each piece of the model 800 against each other piece of the model 800 for escapability and determines that the first piece 802 and the second piece 804 do not escape each other, the first piece 802 and the third piece 806 do escape each other, the first piece 802 and the fourth piece 808 do escape each other, the first piece 802 and the fifth piece 810 do escape each other, the second piece 804 and the third piece 806 do escape each other, the second piece 804 and the fourth piece 808 do escape each other, the second piece 804 and the fifth piece 810 do escape each other, the third piece 806 and the fourth piece 808 do not escape each other, the third piece 806 and the fifth piece 810 do escape each other, and the fourth piece 808 and the fifth piece 810 do escape each other.

Based on this, the multi-part counting system 105 determines that the first piece 802 and the second piece 804 are interlocking, that the third piece 806 and the fourth piece 808 are interlocking, and that the fifth piece 810 is a discrete piece. As such, the multi-part counting system combines the first piece 802 and the second piece 804 into a first interlocking part 812 and the third piece 806 and the fourth piece 808 into a second interlocking part 814. During the all-escape test analysis, the multi-part counting system analyzes the escapability of the first interlocking part 812, the second interlocking part 814, and the fifth (discrete) piece 810 and determines that the first interlocking part 812, the second interlocking part 814, and the fifth piece 810 can all simply escape from each other. As a result, the multi-part counting system 105 outputs an identification of two interlocking parts and one discrete part.

By analyzing a user-provided model with both a test that determines the escapability of individual pairs of pieces in the model and a test that compares individual pieces against all other pieces in the model, the number and identification of parts (discrete and/or interlocking) in the user-provided model may be more accurately determined.

Various embodiments according to the present invention may be implemented on one or more computer systems or other devices. A computer system may be a single computer that may include a minicomputer, a mainframe, a server, a personal computer, or combination thereof. The computer system may include any type of system capable of performing remote computing operations (e.g., cell phone, PDA, tablet, smart-phone, set-top box, or other system). A computer system used to run the operation may also include any combination of computer system types that cooperate to accomplish system-level tasks. Multiple computer systems may also be used to run the operation. The computer system also may include input or output devices, displays, or data storage units. It should be appreciated that any computer system or systems may be used, and the invention is not limited to any number, type, or configuration of computer systems.

These computer systems may be, for example, computers such as those based on an Intel processor, Motorola PowerPC, or any other type of processor. It should be appreciated that one or more of any type computer system may be used to partially or fully automate operation of the described system according to various embodiments of the invention. Further, the system may be located on a single computer or may be distributed among a plurality of computers attached by a communications network.

Figure 9:
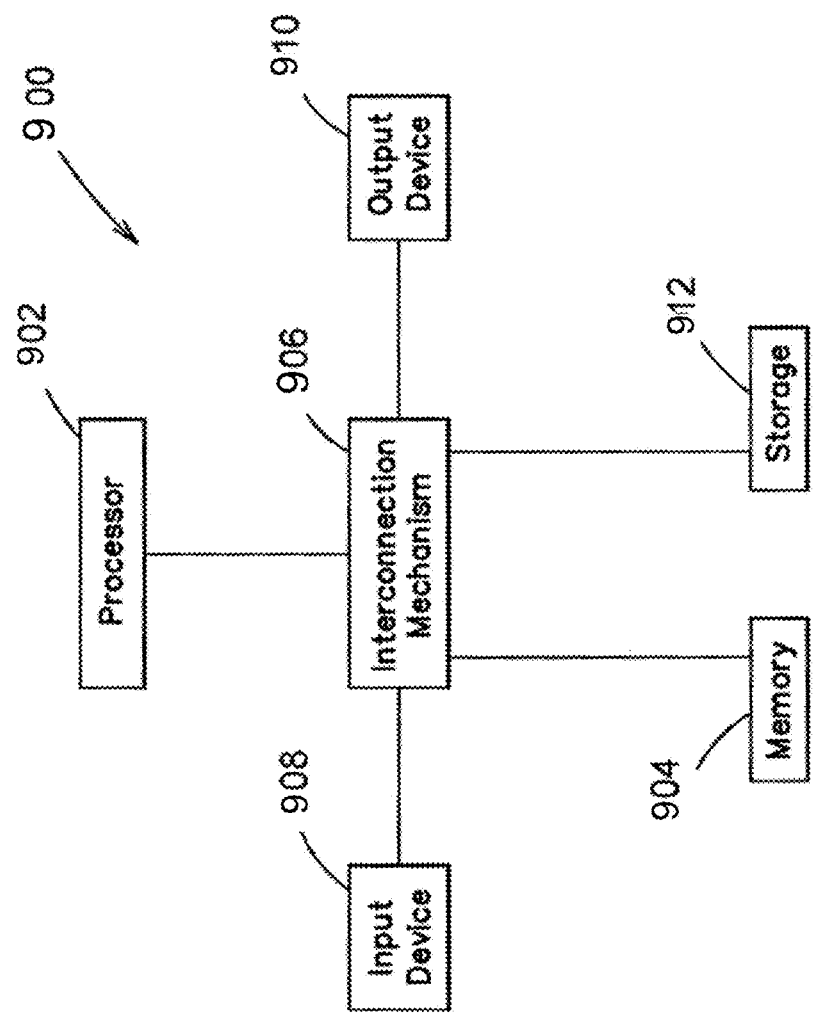
FIG. 9 is a block diagram of a computer system upon which various embodiments of the invention may be implemented.

For example, various aspects of the invention may be implemented as specialized software executing in a computer system 900 such as that shown in FIG. 9. The computer system 900 may include a processor 902 connected to one or more memory devices (i.e., data storage) 904, such as a disk drive, memory, or other device for storing data. Memory 904 is typically used for storing programs and data during operation of the computer system 900. Components of computer system 900 may be coupled by an interconnection mechanism 906, which may include one or more busses (e.g., between components that are integrated within a same machine) and/or a network (e.g., between components that reside on separate discrete machines). The interconnection mechanism 906 enables communications (e.g., data, instructions) to be exchanged between system components of system 900. Computer system 900 also includes one or more input devices 908, for example, a keyboard, mouse, trackball, microphone, touch screen, and one or more output devices 910, for example, a printing device, display screen, and/or speaker. In addition, computer system 900 may contain one or more interfaces that connect computer system 900 to a communication network (in addition or as an alternative to the interconnection mechanism 906).

The storage system 912, shown in greater detail in FIG. 10, typically includes a computer readable and writeable nonvolatile recording medium 1002 in which signals are stored that define a program to be executed by the processor or information stored on or in the medium 1002 to be processed by the program. The medium may, for example, be a disk or flash memory. Typically, in operation, the processor causes data to be read from the nonvolatile recording medium 1002 into another memory 1004 that allows for faster access to the information by the processor than does the medium 1002. This memory 1004 is typically a volatile, random access memory such as a dynamic random access memory (DRAM) or static memory (SRAM). It may be located in storage system 912, as shown, or in memory system 904. The processor 902 generally manipulates the data within the integrated circuit memory 904, 1004 and then copies the data to the medium 1002 after processing is completed. A variety of mechanisms are known for managing data movement between the medium 1002 and the integrated circuit memory element 904, 1004, and the invention is not limited thereto. The invention is not limited to a particular memory system 904 or storage system 912.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 900 is shown by way of example as one type of computer system upon which various aspects of the invention may be practiced, it should be appreciated that aspects of the invention are not limited to being implemented on the computer system as shown in FIG. 9. Various aspects of the invention may be practiced on one or more computers having a different architecture or components than that shown in FIG. 9.

Computer system 900 may be programmable using a high-level computer programming language. Computer system 900 may be also a specially-designed computer implemented using specially programmed, special purpose hardware. In computer system 900, processor 902 is typically a commercially available processor such as the well-known Pentium class processor available from the Intel Corporation. Many other processors are available. Such a processor usually executes an operating system which may be, for example, the Windows 7, or Windows 8 operating systems available from the Microsoft Corporation, MAC OS System X operating system or an iOS operating system available from Apple Computer, one of many Linux-based operating system distributions, for example, the Enterprise Linus operating system available from Red Hat Inc., or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol. Various embodiments of the present invention may be programmed using an object-oriented programming language, such as Java, C++, or C# (C-Sharp). Other object-oriented programming languages may also be used. Various embodiments of the present invention may be programmed with a Graphics Processing Unit (GPU) language such as OpenCL, CUDA, or some other language specialized for graphics cards.

Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

As described above, a system and method for identifying the different 3D printed parts of a user uploaded model is provided. By analyzing a user-provided model with both a test that determines the escapability of individual pairs of pieces in the model and a test that simultaneously compares individual pieces against all other pieces in the model, the number and identification of pieces (discrete and/or interlocking) in the user-provided model may be more accurately determined. By correctly identifying the different parts (discrete or interlocking) of a user uploaded model, before the model has been printed, a manufacturer may be able to more accurately and efficiently identify, print, price, clean, tag, and/or assemble the parts of a printed model.

For example, in one embodiment, once the different parts of a user-provided model are identified by the multi-part counting system 105, the production planning system 104 may break the user-provided model into different files, each file including a single part (i.e., single discrete part or interlocking part). The individual files may be provided to the printer 106 for printing.

In one embodiment, the individual files are stored in the database 108 for future processing/reference. In another embodiment, the production planning system 104 compares the individual files related to a currently being processed user-provided model to files stored in the database 108 of previously printed parts. By doing this, the production planning module 104 can determine if a part of the current model has been printed before.

For example, in one embodiment, the production planning system 104 can identify that a part has been printed before and check inventory records (e.g., in the database) to determine if the part is currently in inventory, therefore not requiring printing. In another embodiment, by comparing individual files related to a currently being processed user-provided model to files stored in the database 108 of previously printed parts, the production planning system 104 can determine if the part should not be printed (e.g., due to copyright concerns). In another embodiment, by comparing individual files related to a currently being processed user-provided model to files stored in the database 108 of previously printed parts, the production planning system 104 can determine if the printing of a same, or very similar, part has been attempted before. If the printing of a same or similar part has failed before, the production planning system 104 may determine that the printing of the current part should not be attempted again. Also, by breaking a model down into its individual parts, the production planning system can determine if the manufacturer system 102 is actually restricted from printing any of the parts (e.g., because of firearms regulations).

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A 3D printing system, comprising:
a database;
at least one computer hardware processor; and
at least one non-transitory computer-readable storage medium storing processor-executable instructions that, when executed by the at least one computer hardware processor, cause the at least one computer hardware processor to perform:
receiving a 3D model of an object to be printed using a 3D printing process, the 3D model comprising a plurality of pieces including a first piece;
determining whether the first piece can be moved outside a boundary of the 3D model without intersecting any other piece of the plurality of pieces; of
responsive to determining that the first piece cannot be moved outside the boundary of the 3D model without intersecting a second piece of the plurality of pieces, identifying the first piece and the second piece as interlocking pieces in a first interlocking part;
responsive to determining that the first piece can be moved outside the boundary of the 3D model without intersecting another piece of the plurality of pieces, identifying the first piece as a first discrete part;
storing either the first interlocking part or the first discrete part in a file;
determining whether printing of a same or similar part has previously failed at least in part by comparing the file to a plurality of files stored in the database, the plurality of files corresponding to previously printed parts; and
responsive to determining that printing the same or similar part has not previously failed, transmitting the file to a 3D printer.

2. The 3D printing system of claim 1, wherein determining whether the first piece can be moved outside the boundary of the 3D model without intersecting any other piece of the plurality of pieces comprises:
partitioning the first piece into a plurality of segments;
for each of the plurality of segments:
attempting to move, via an escape path, the segment outside the boundary of the 3D model; and
determining if, along the escape path, the segment intersects another piece of the plurality of pieces;
responsive to determining that at least one of the plurality of segments intersects the second piece, determining that the first piece cannot be moved outside the boundary of the 3D model without intersecting the second piece; and
responsive to determining that none of the plurality of segments intersects another piece of the plurality of pieces, determining that the first piece can be moved outside the boundary of the 3D model without intersecting another piece of the plurality of pieces.

3. The 3D printing system of claim 2, wherein the plurality of segments comprise voxels.

4. The 3D printing system of claim 2, wherein the plurality of segments comprise triangular patches.

5. The 3D printing system of claim 2, wherein the escape path comprises a complex escape path.

6. The 3D printing system of claim 1, wherein the instructions, when executed by the at least one computer hardware processor, further cause the at least one computer hardware processor to perform:
responsive to determining that the first piece can be moved outside the boundary of the 3D model without intersecting the second piece, identifying the first piece and the second piece as discrete pieces relative to each other.

7. The 3D printing system of claim 1, wherein the instructions, when executed by the at least one computer hardware processor, further cause the at least one computer hardware processor to perform:
identifying a plurality of parts of the 3D model, the plurality of parts including the first interlocking part;

determining whether the first interlocking part can be moved outside the boundary of the 3D model without intersecting any other part of the plurality of parts; and responsive to determining that the first interlocking part cannot be moved outside the boundary of the 3D model without intersecting a second part, identifying a second interlocking part that includes the first interlocking part and the second part.

8. The 3D printing system of claim 1, wherein the instructions, when executed by the at least one computer hardware processor, further cause the at least one computer hardware processor to perform:

identifying a plurality of parts of the 3D model, the plurality of parts including the first discrete part;

determining whether the first discrete part can be moved outside the boundary of the 3D model without intersecting any other part of the plurality of parts; and responsive to determining that the first discrete part cannot be moved outside the boundary of the 3D model without intersecting a second part, identifying a second interlocking part that includes the first discrete part and the second part.

9. The 3D printing system of claim 1, wherein the instructions, when executed by the at least one computer hardware processor, further cause the at least one computer hardware processor to perform:

identifying a number of discrete parts and a number of interlocking parts in the 3D model.

10. The 3D printing system of claim 1, wherein the instructions, when executed by the at least one computer hardware processor, further cause the at least one computer hardware processor to perform:

responsive to determining that printing the same or similar part has previously failed, determining to not print the first interlocking part or the first discrete part stored in the file.

11. A method for printing 3D parts, the method comprising:

using at least one computer hardware processor to perform:

receiving, a 3D model of an object to be printed using a 3D printing process, the 3D model comprising a plurality of pieces including a first piece;

determining whether the first piece can be moved outside a boundary of the 3D model without intersecting any other piece of the plurality of pieces;

responsive to determining that the first piece cannot be moved outside the boundary of the 3D model without intersecting a second piece of the plurality of pieces, identifying the first piece and the second piece as interlocking pieces in a first interlocking part;

responsive to determining that the first piece can be moved outside the boundary of the 3D model without intersecting another piece of the plurality of pieces, identifying the first piece as a first discrete part;

storing either the first interlocking part or the first discrete part in a file;

determining whether printing of a same or similar part has previously failed at least in part by comparing the file to a plurality of files stored in a database, the plurality of files corresponding to previously printed parts; and responsive to determining that printing the same or similar part has not previously failed, transmitting the file to a 3D printer.

12. The method of claim 11, wherein determining whether the first piece can be moved outside the boundary of the 3D model without intersecting any other piece comprises:

partitioning the first piece into a plurality of segments;

for each of the plurality of segments:
attempting to move, via an escape path, the segment outside the boundary of the 3D model; and
determining if, along the escape path, the segment intersects another piece of the plurality of pieces;

responsive to determining that at least one of the plurality of segments intersects the second piece, determining that the first piece cannot be moved outside the boundary of the 3D model without intersecting the second piece; and responsive to determining that none of the plurality of segments intersects another piece of the plurality of pieces, determining that the first piece can be moved outside the boundary of the 3D model without intersecting another piece of the plurality of pieces.

13. The method of claim 11, further comprising:

identifying a plurality of parts of the 3D model, the plurality of parts including the first interlocking part;

determining whether the first interlocking part can be moved outside the boundary of the 3D model without intersecting any other part of the plurality of parts; and responsive to determining that the first interlocking part cannot be moved outside the boundary of the 3D model without intersecting a second part, identifying a second interlocking part that includes the first interlocking part and the second part.

14. The method of claim 11, further comprising:

identifying a plurality of parts of the 3D model, the plurality of parts including the first discrete part;

determining whether the first discrete part can be moved outside the boundary of the 3D model without intersecting any other part of the plurality of parts; and responsive to determining that the first discrete part cannot be moved outside the boundary of the 3D model without intersecting a second part, identifying a second interlocking part that includes the first discrete part and the second part.

15. The method of claim 11, further comprising identifying a number of discrete parts and a number of interlocking parts in the 3D model.

16. The method of claim 11, further comprising:

responsive to determining that printing the same or similar part has previously failed, determining to not print the first interlocking part or the first discrete part stored in the file.

17. A 3D printing system comprising:

a 3D printer;

at least one computer hardware processor; and at least one non-transitory computer-readable storage medium storing processor-executable instructions that, when executed by the at least one computer hardware processor, cause the at least one computer hardware processor to perform:

receiving a 3D model of an object to be printed using the 3D printer, the 3D model comprising a plurality of pieces including a first piece;

determining whether the first piece can be moved outside a boundary of the 3D model without intersecting any other piece of the plurality of pieces;

responsive to determining that the first piece cannot be moved outside the boundary of the 3D model without intersecting a second piece of the plurality of pieces, identifying the first piece and the second piece as interlocking pieces in a first interlocking part;

responsive to determining that the first piece can be moved outside the boundary of the 3D model without intersecting another piece of the plurality of pieces, identifying the first piece as a first discrete part;

storing either the first interlocking part or the first discrete part in a file;

determining whether printing of a same or similar part has previously failed at least in part by comparing the file to a plurality of files stored in a database, the plurality of files corresponding to previously printed parts; and responsive to determining that printing the same or similar part has not previously failed, transmitting the file to the 3D printer.

* * * * *